US006580926B1

(12) United States Patent
Levy

(10) Patent No.: US 6,580,926 B1
(45) Date of Patent: Jun. 17, 2003

(54) COMMUNICATION METHOD BETWEEN A BASE STATION WITH N ANTENNAE AND A MOBILE PHONE AND BASE STATION FOR IMPLEMENTING SAME

(75) Inventor: Armand Levy, Paris (FR)

(73) Assignee: France Telecom (FR)

( * ) Notice: Subject to any disclaimer, the term of this patent is extended or adjusted under 35 U.S.C. 154(b) by 0 days.

(21) Appl. No.: 09/424,704
(22) PCT Filed: May 25, 1998
(86) PCT No.: PCT/FR98/01037
§ 371 (c)(1),
(2), (4) Date: Feb. 23, 2000
(87) PCT Pub. No.: WO98/54786
PCT Pub. Date: Dec. 3, 1998

(30) Foreign Application Priority Data

May 28, 1997 (FR) .............................................. 97 06535

(51) Int. Cl.[7] ................................................. H04B 1/38
(52) U.S. Cl. ...................................... 455/562; 455/564
(58) Field of Search .................................. 455/562, 564

(56) References Cited

U.S. PATENT DOCUMENTS

| 5,542,101 A | * | 7/1996 | Pal .............................. 455/65 |
| 5,914,946 A | * | 6/1999 | Avidor et al. ................ 370/336 |
| 5,920,813 A | * | 7/1999 | Evans et al. ................. 455/422 |

* cited by examiner

*Primary Examiner*—Lee Nguyen
*Assistant Examiner*—Danh C.. Le
(74) *Attorney, Agent, or Firm*—Piper Rudnick

(57) ABSTRACT

In order to process communications between a base station comprising an N separate antennae network, N being a whole number greater than 1, and at least one mobile phone, the method consists of the following steps: estimating the incoming direction and the path power to the base station; determining a main incoming direction of those paths to the base station; selecting antennae, M being a whole number less than N, whereof the individual receiver, respectively transmitter, lobes have directions contained in an angular sector centred on the main incoming direction; processing only the signals received by the M selected main antennae coming from the mobile phone, respectively synthesising only the signals to be transmitted by the M selected antennae.

4 Claims, 3 Drawing Sheets

COMMUNICATION METHOD BETWEEN A BASE STATION WITH N ANTENNAE AND A MOBILE PHONE AND BASE STATION FOR IMPLEMENTING SAME

The invention relates to a radio communication method at high frequency between a base station with N antennae and a mobile phone, and a base station for implementing same.

It can be applied to digital cell telephone systems in which one and the same station is provided with a network of antennae allowing it to serve a plurality of mobile phones in a cell.

In such a station, during transmission, the signals to be applied to each antenna are synthesised on the basis of the signal intended to reach the mobile phone.

To achieve this, in the transmission chain of each antenna a number of digital processes generally produce samples representing these signals. Then, by means of digital-analog conversion and modulation to the carrier frequency, each signal is synthesised then simplified and applied to the appropriate antenna of the network.

The complexity of the calculations necessary to synthesise these patterns, and the cost of the digital-analog conversion circuits and of modulation, increase with the number of antennae in the network.

Hereinafter, the term multi-sensor transmission device shall be used to refer to the whole of the circuits which produce the signals applied to each elementary antenna for transmission to the mobile phone.

At reception, in analog mode, the reception chain of each antenna feeds the signals received by this antenna into an intermediary frequency or the base band. The signals are then sampled and subjected to analog-digital conversion. The samples are then processed by digital processes to extract the information transmitted by the mobile phone.

The complexity and the cost of the circuits of the reception paths again increase with the number of antennae in the network.

Hereinafter, the term multi-sensor reception device shall be used to refer to the whole of the circuits which process the signals received from the mobile phone in order to extract the information transmitted.

The network of antennae may feature any geometry considered appropriate. In particular, the antennae may be disposed in line and regularly spaced. In this event, they are preferably directional, and their lobes point in the orthogonal direction to the right of which the antennae are aligned.

The antennae may equally be disposed in a circle and regularly spaced. In this event, the antennae are likewise preferably directional and their lobes point in a radial direction towards the outside of the circle on which they are disposed.

The invention applies likewise to a network of antennae presenting a regular polygon geometry such as an equilateral triangle, a square, a pentagon, a hexagon, etc., with antennae spaced regularly along its sides.

The objective of the invention is to reduce the complexity of the calculation and the cost of the processing procedures carried out by a base station provided with a network of antennae.

In order to achieve this objective, the invention proposes a method of communication between a base station consisting of a network of N distinctive antennae, N being a whole number greater than 1, and at least one mobile telephone, characterised in that:

(a) The directions of arrival and the power values of the radio-electrical paths are estimated at the base station;

(b) A principal direction of arrival is determined for said mobile telephone of said radio-electrical paths at the base station;

(c) M antennae are selected, M being a whole number less than N, the individual reception lobes of which have directions contained in an angular sector centred on the principal direction of arrival;

(d) Only the signals which are received by the M antennae selected and deriving from the mobile telephone are processed.

For the transmission according to this process, (e) M antennae are selected, of which the individual transmission lobes have directions contained within angular sector centred on the principal direction of arrival;

(f) Only the signals to be transmitted by the M antennae selected are synthesised.

The invention likewise proposed a radio communications base station with mobile telephones, comprising a network of different N antennae, N being a whole number greater than 1, and K reception or transmission chains, K being a whole number less than N×L, where L is the number of simultaneous communications, characterised in that it comprises:

Means of assessing the directions of arrival and the power values of the radio-electrical paths at the base station;

Means of determining, for a given mobile telephone, a principal direction of arrival of the radio-electrical paths at the base station;

Means of selection of M antennae, M being a whole number less than N, of which the individual reception or transmission lobes have directions contained within an angular sector centred on the principal direction of arrival;

Means of switching, affecting, for each communication, M reception or transmission chains at the M antennae previously selected.

In a specific embodiment of the invention, the principal direction referred to heretofore is the direction of arrival for which the radio-electric power received or transmitted and reaching the mobile telephone (according to whether it is in reception or transmission mode) is the greatest.

In another specific embodiment of the invention, the principal direction referred to heretofore is the barycentre r of the directions of arrival of the different radio-electric paths, defined as follows:

$$r = \left(\sum_{i=1}^{J} p_i \cdot a_i\right) \Big/ \left(\sum_{i=1}^{J} p_i\right)$$

where i is a whole number, where J is the number of radio-electrical paths identified, where $a_i$ is the angle formed by the $i^{th}$ radio-electrical path in relation to the direction of the path having the greatest radio-electrical power value, and where $p_i$ is the radio-electrical power of the $i^{th}$ path.

Other features and advantages of the invention are clearly indicated in the following detailed description of specified embodiments, given by way of non-limiting examples. The description refers to the accompanying drawings, in which.

The invention will first be described by considering one single communication between a base station and a given mobile telephone.

Figure 1:
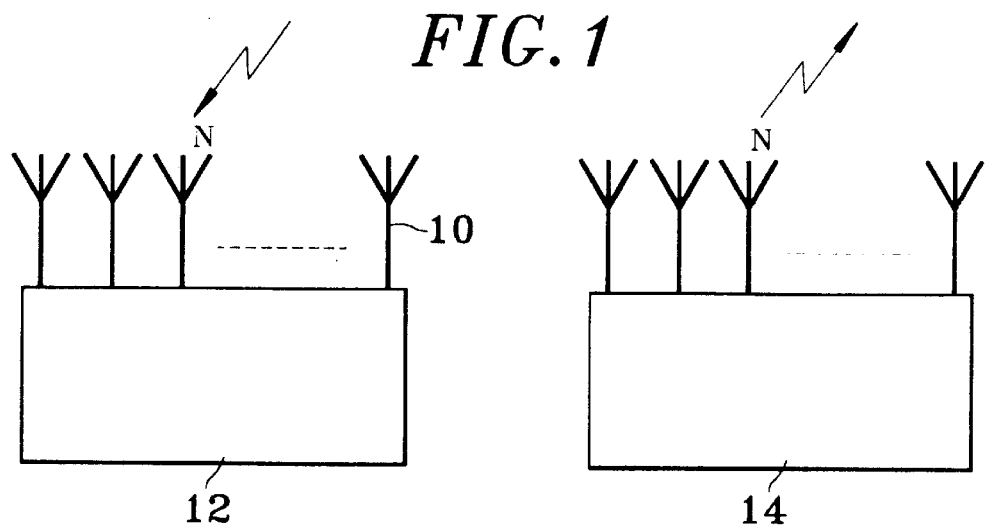
FIG. 1 represents in schematic form traditional multi-sensor reception and transmission devices, wherein one single communication is being considered between the base station and a mobile telephone.

In the traditional situation represented in FIG. 1, whether in reception mode (left-hand part of the figure) or in transmission mode (right-hand part of the figure), the number N of antennae, each designated in the figure by the reference number 10, of the base station corresponds to the number of signals which are capable of being processed (in reception) or of being synthesised (in transmission) by a multi-sensor reception device 12 or a multi-sensor transmission device 14, comprised in the base station.

Typically, these devices comprise the same number of reception and transmission chains as there are elementary antennae in the network, this being N in the example illustrated.

It is recalled that each reception chain comprises essentially a pre-amplification module, a frequency conversion module for the transition to intermediary frequency or base band, and an analog-digital conversion module. Each transmission chain comprises essentially a numerical-digital conversion module, a frequency conversion module to pass to the transmission carrier frequency, and an amplification module.

Figure 2:
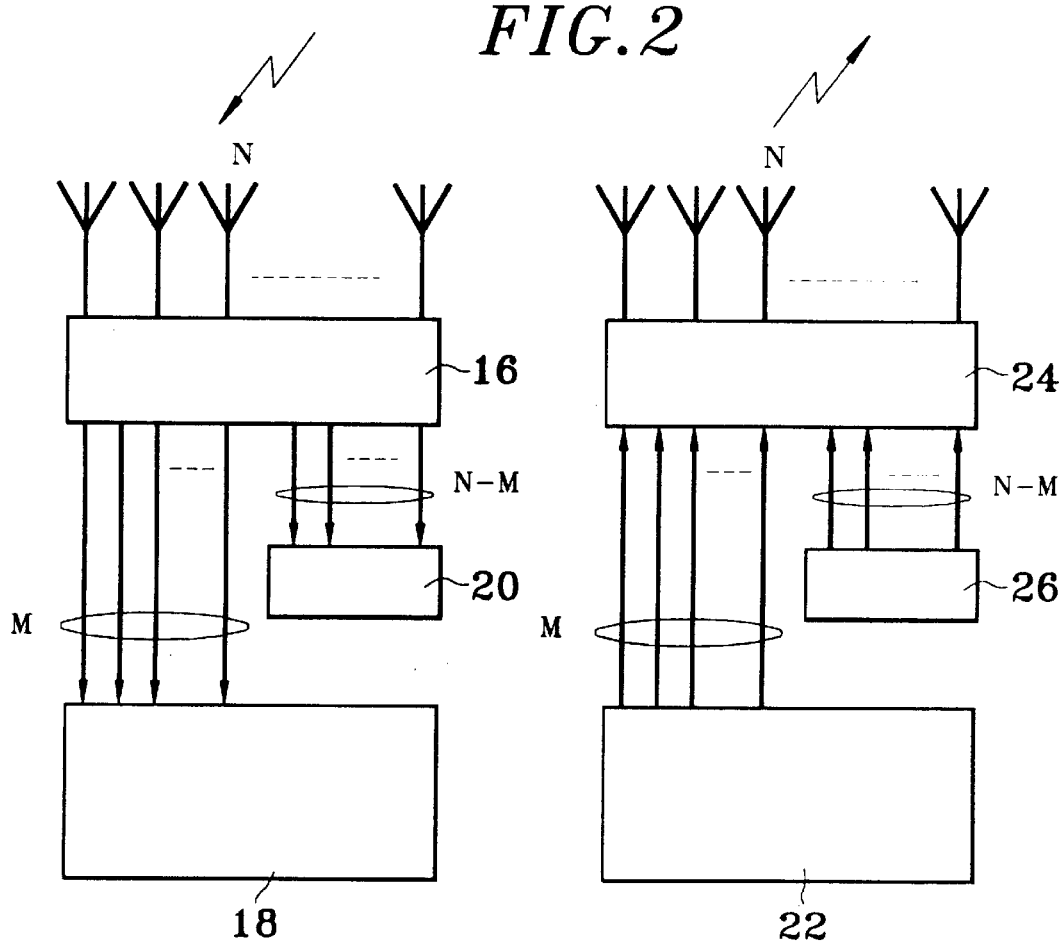
FIG. 2 represents in schematic form the reception and transmission devices comprised in a base station conforming to a particular embodiment of the invention, wherein a single communication is considered between the base station and a mobile telephone.

The left-hand part of FIG. 2 represents a reception device included in a base station of N antennae in accordance with an embodiment of the present invention.

When a mobile telephone transmits a signal in the direction of the base station, the base station activates a module for estimating the directions of arrival and the power values of the radio-electrical paths at the base station (not represented in FIG. 2). A traditional process for locating the source is then put into effect, for example of the type of those described in the following documents: ANDERSON S., MILLNERT M., VIBERG M., WAHLBERG B. "An adaptive array for mobile communication systems", IEEE Transactions on Vehicular Technology, Vol. 40, No. 1, February 1991, pages 230–236; VIBERG M., OTTERSTEN B., "Sensor array processing based on subspace fitting", IEEE Transactions on Signal Processing, Vol. 39, No. 5, May 1991, pages 1110–1121; SCHMIDT R. O., "A signal subspace approach to multiple emitter location and spectral estimation", Ph.D. dissertation, Stanford Univ., Stanford, Calif., November 1981; ROY R. H., PAULRAJ A., KAILATH T., "ESPRIT—A subspace rotation approach to estimation of parameters of cisnoids in noise", IEEE Trans. Acoust., Speech Signal Processing, Vol. ASSP-34, No. 4, pages 1340–1342, October 1986.

The base station then determines, for this mobile telephone, a direction of arrival which is referred to as the principal direction of arrival. The signals emitted by the mobile telephone to the base station effectively undergo reflexions on various obstacles and give rise to multiple paths. The principal direction of arrival may be that for which the radio-electrical power received by the base station is the greatest.

As a variation, the principal direction of arrival may be the barycentre r of the directions of arrival of the different radio-electrical paths identified, weighted by a function of the radio-electrical power values of these paths.

The module for determining the principal direction of arrival is not shown in FIG. 2.

Let J be the number of radio-electrical paths identified. Let $a_i$ be the angle formed by the $i^{th}$ radio-electrical path, i being a whole number, in relation to the direction of the path for which the radio-electrical power is the greatest. Let $p_i$ be the radio-electrical power of the $i^{th}$ path. The barycentre r is defined by $$r = \left(\sum_{i=1}^{J} p_i \cdot a_i\right) / \left(\sum_{i=1}^{J} p_i\right)$$

Once the principal direction of arrival has been determined, the base station activates a search or selection module (not shown) in order to determine, among the N antennae of the network, a more restricted set of antennae which will be exploited for the communication process under consideration. According to an advantageous embodiment of the invention, the set used for reception comprises M antennae, of which the individual reception lobes have directions contained within a predetermined amplitude angle sector, centred on the principal direction of arrival.

The number M may vary from one communication to another, and depends on the number of processing circuits available.

Figure 4:
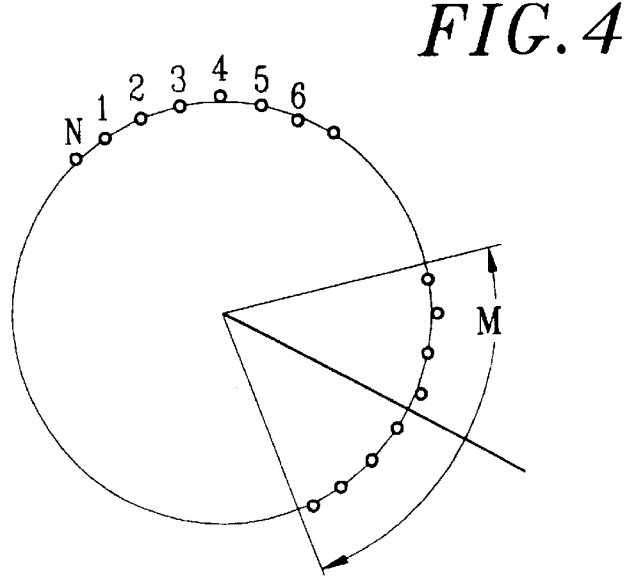
FIG. 4 illustrates a method of selection of M antennae among N, in a specific embodiment of the invention, wherein the network of antennae presents a circular geometry.

FIG. 4 shows a configuration in which an angular sector centred on a principal direction of arrival comprises m antennae, selected from among N, for a network of antennae of circular geometry; the N elementary antennae represented are disposed equally around the circle.

As FIG. 2 (left-hand part) shows, the base station comprises a reception switching matrix 16, which directs the signals received from the mobile telephone by the M antennae selected towards the multi-sensor reception device 18. The signals which are not processed by the multi-sensor reception device are orientated onto a load 20 which corresponds to the impedance of the N-M antennae not selected.

The right-hand section of FIG. 2 represents a transmission device integrated in a base station with N antennae, in accordance with a specific embodiment of the invention. In transmission mode, in a manner analogous to that just described for reception, the base station includes a search module (not shown) of M antennae, the individual transmission lobes of which have directions contained within an angular sector of a predetermined amplitude, centred on the principal direction of arrival.

The base station likewise comprises a multi-sensor transmission device 22, which synthesises only the M signals to be transmitted by the M antennae selected. A transmission switching matrix 24 directs the synthesised signals to apply them to these M antennae. The N-M antennae not selected are connected to a single load 26, corresponding to their impedance.

It is assumed in this situation that the same network of antennae serves for transmission and reception. Provision can be made for the reception and transmission switching matrices to be one and the same bi-directional matrix, the signals received and transmitted circulating in opposed directions on the same cables. As a variant, provision may be made for a duplex filter, which separates the signals received and transmitted at the level of each elementary antenna, and two distinct switching matrices operating in an independent manner.

It will be noted that the switching matrices for reception and transmission, depending on the means of realisation, may be either hardware devices, or software realisations.

In addition to this, in the specific case of the application of the invention to a system operating in time-division multiple access (TDMA) mode, the previous arrangement is effected for a given period of time. In effect, the group of M antennae selected is subject to being changed from one time sector to the one following, i.e. from one communication link to the other.

Figure 3:
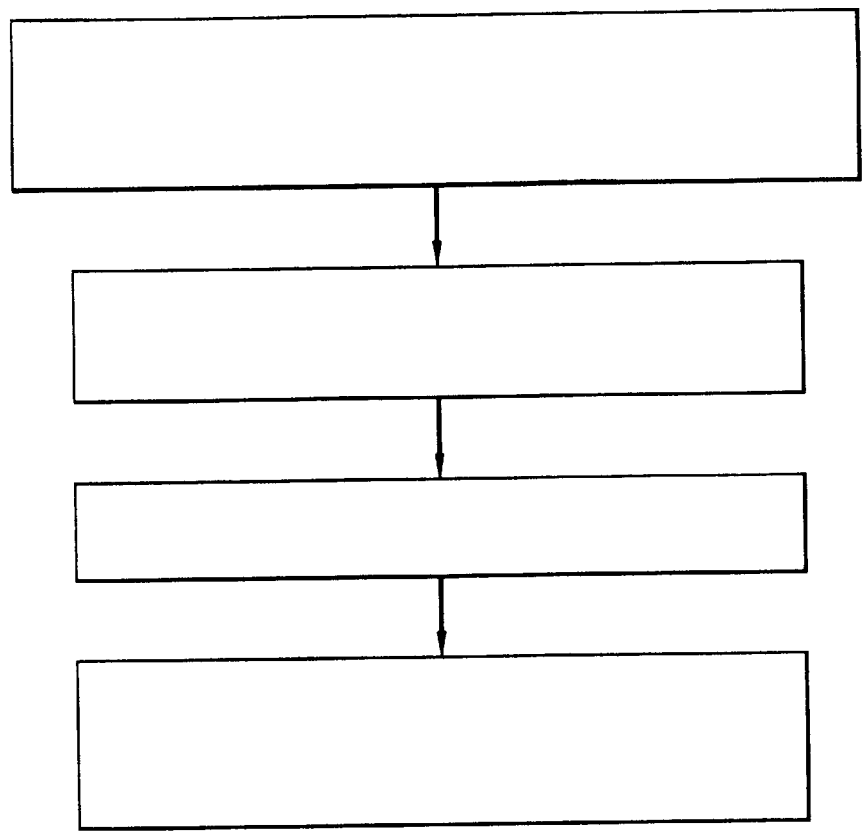
FIG. 3 is an organizational diagram of the process according to the invention, in a specific embodiment.

FIG. 3 provides a summarised version of the different stages of the process according to the invention, in a specific embodiment.

In the course of a first stage, the directions of arrival and the power values of the radio-electrical path values at the base station are estimated. A principal direction of arrival is then determined for this mobile telephone. Next a selection is made, from among the N antennae of the network, of M antennae of which the individual reception or transmission lobes have directions contained within an angular sector centred on the principal direction of arrival. In the final analysis, only the signals received or to be transmitted by the M antennae selected are processed (in reception) or synthesised (in transmission).

The description provided heretofore in relation to FIGS. 1 and 2 relate to a given communication link between the base station and a single mobile telephone. In practice, a base station serves a large number of simultaneous communications links with several mobile telephones. In the TDMA mode, the signals from the different communications links occupy different and identical time sectors within successive cycles. It is considered hereinafter that L communication links are effected simultaneously. The number L represents the number of communications links actually effected simultaneously, i.e., for example, sharing the same cycle of time sectors in TDMA mode.

Figure 5:
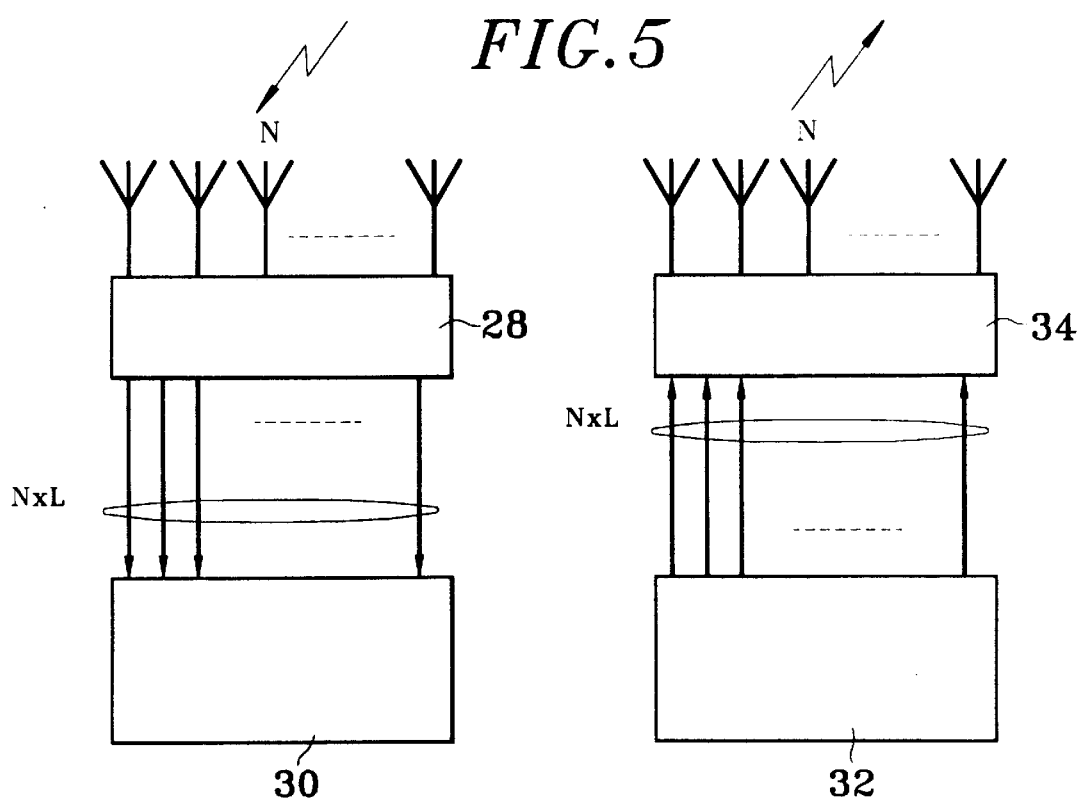
FIG. 5 represents in schematic form traditional multi-sensor reception and transmission devices, wherein the base station is processing L simultaneous communications.

In reception mode, in a traditional device such as that represented in the left-hand part of FIG. 5, the signals received by the N antennae are processed by N reception chains 28, which separate the signals corresponding to each of the L communications links for each antenna. The N×L signals which result are then received by a multi-sensor reception device 30, which processes the N signals received for each communications link.

In transmission mode (right-hand part of FIG. 5), in a traditional device, a multi-sensor transmission device 32 synthesises N signals to be transmitted by the N antennae of the network for each communication link. The N×L signals which result are transmitted to N transmission chains 34, which add together the contributions from each of the communications to be transmitted by each antenna. All the communications links then exploit all the antennae, both in reception and in transmission.

Figure 6:
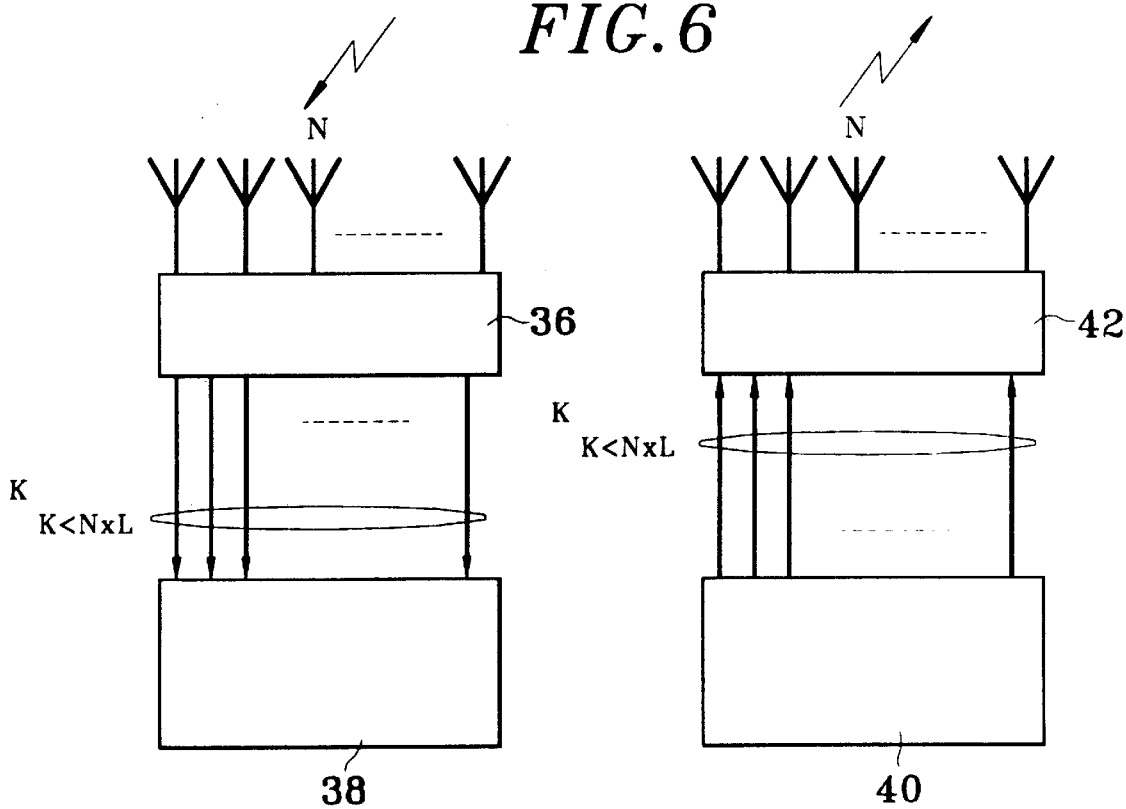
FIG. 6 represents in schematic form reception and transmission devices comprised in a base station in accordance with a specific embodiment of the invention, wherein the base station is processing L communications simultaneously.

If the present invention is applied in reception mode (left-hand part of FIG. 6), for each of the L simultaneous communications links, the M antennae used are selected in the manner described heretofore in the case of a single communication link. M reception chains 36 then separate, for each of the M antennae selected, the communications signals which have selected this antenna. A multi-sensor reception device 38 then processes, for each communication link, M signals received.

If the present invention is applied in transmission mode (right-hand part of FIG. 6), for each of the simultaneous L communication links, the M antennae used by one of the L communication links are selected in the manner described heretofore in the case of a single communication link. A multi-sensor transmission device 40 synthesises, for each communication link, M signals to be transmitted by the M antennae selected. The resultant signals are transmitted to the transmission chains 42, which add up, for each antenna, the contributions from the communications which have selected this antenna. Each communication link accordingly only exploits a part of the antennae, which considerably reduces the complexity of the processing: In reception mode, these processing procedures exploit, for each communication link, M signals received instead of N, and, in transmission, for each communication link, M signals are synthesised instead of N.

If the base station comprises a total number K of transmission-reception chains, K being a whole number less than N×L, the maximum number of signals issued from the reception chains 36 or from the multi-sensor transmission device 40 is equal to K.

Depending on the situation, it may be of interest to choose:
   Either to fix M, and to make provision for a number K of chains equal to M×L,
   Or to allow M to vary, and to consider the whole of the transmission-reception chains as a group or pool, which is applied to each communication (as a function of the number of simultaneous communication links to be effected).

In the event that the principal directions of arrival associated with several mobile telephones correspond to groups of antennae comprised within angular sectors which overlap, i.e. which have one or more antennae in common, it is possible that a conflict of utilisation may arise between these communications links, involving the use of the same transmission-reception chains. It is appropriate to implement only a certain number of the communication links in conflict at these antennae, In accordance with a predetermined criterion. This criterion may consist, by way of a non-limiting example, of balancing the radio-electrical power values received, by assigning these antennae to the communication link for which the received power is the weakest.

Experience has shown that it is possible to attain performance values similar to those obtained with the complete network, making use only of half of the elementary antennae which constitute the network.

A further advantage of the invention is that it allows, at reduced cost and in a continuous manner, for the base station to carry out the whole of the spatial processing, by distinction from traditional base stations, consisting of sectoral antennae, which superimpose two spatial processing procedures, i.e. that of the antennae network and that of the sectorisation.

What is claimed is:
1. Communication method between a base station comprising a network of N distinct antennae, N being a whole number greater than 1, and at least one mobile telephone, comprising the steps of:
   (a) estimating at the base station, the directions of arrival and the power values of radio-electrical path at the base station;
   (b) determining for this mobile telephone, a principal direction of arrival of said radio-electrical paths at the base station, by choosing a barycentre r of the directions of arrival of the different radio-electrical paths as being the principal direction of arrival, define as follows:

$$r = \sum_{i=1}^{J} p_i * a_i \bigg/ \sum_{i=1}^{J} p_i$$

where i is a whole number, where J is the number of radio-electrical paths identified, where $a_i$ is the angle formed by the $i^{th}$ radio-electrical path in relation to the direction of the path which has the greatest radio-electrical power value, and where $p_i$ is the radio-electrical power value of the $i^{th}$ path;

(c) selecting M antennae, M being a whole number strictly greater than 1 and less than N, of which the individual reception lobes have directions which are contained within an angular sector centered on the principal direction of arrival;

(d) processing only the signals received by the selected M antennae from the mobile telephone.

2. The method of claim 1 further comprising the steps of:

(a) selecting M antennae of which the individual transmission lobes have directions contained within an angular sector centered on the principal direction of arrival;

(b) synthesizing only the signals to be transmitted by the selected M antennae.

3. A radio base station for communication with mobile telephones, comprising a network of N distinct antennae, N being a whole number greater than 1, and K reception or transmission chains, K being a whole number less than N×L, where L is the number of simultaneous communications, the radio base station comprising:

means of estimating the directions of arrival and the radio electrical power values of the radio-electrical paths at the base station;

means of determining, for a given mobile telephone, a principal direction of arrival of the radio-electrical paths at the base station, being the direction of arrival for which the radio-electrical power value received or transmitted and deriving from the mobile telephone is the greatest;

means of selecting M antennae, M being a whole number strictly greater than 1 and less than N, of which the individual reception or transmission lobes have directions contained within an angular sector centered on the principal direction of arrival;

means of switching, affecting, for each communications, M reception or transmission chains at the M antennae previously selected.

4. A radio base station for communication with mobile telephones, comprising a network of N distinct antennae, N being a whole number greater than 1, and K reception or transmission chains, K being a whole number less than N×L, where L is the number of simultaneous communications the radio base station comprising:

means of estimating the directions of arrival and the radio electrical power values of the radio-electrical paths at the base station;

means of determining, for a given mobile telephone, a principal direction of arrival of the radio-electrical paths at the base station, being the barycentre r of the directions of arrival of the different radio-electrical paths, defined as follows:

$$r = \sum_{i=1}^{J} p_i * a_i \bigg/ \sum_{i=1}^{J} p_i$$

where i is a whole number, where J is the number of radio-electrical paths identified, where $a_i$ is the angle formed by the $i^{th}$ radio-electrical path in relation to the direction of the path which has the greatest radio-electrical power value, and where $p^i$ is the radio-electrical power value of the $i^{th}$ path;

means of selecting M antennae, M being a whole number strictly greater than 1 and less than N, of which the individual reception or transmission lobes have directions contained within an angular sector centered on the principal direction of arrival;

means of switching, affecting, for each communications, M reception or transmission chains at the M antennae previously selected.

* * * * *